United States Patent
Walach

(10) Patent No.: US 9,303,714 B2
(45) Date of Patent: Apr. 5, 2016

(54) HYDRAULIC DAMPENER SYSTEMS

(71) Applicant: Walach Manufacturing Co., Inc., Chicago, IL (US)

(72) Inventor: David P. Walach, Palatine, IL (US)

(73) Assignee: WALACH MANUFACTURING CO., INC., Chicago, IL (US)

( * ) Notice: Subject to any disclaimer, the term of this patent is extended or adjusted under 35 U.S.C. 154(b) by 72 days.

(21) Appl. No.: 14/206,555

(22) Filed: Mar. 12, 2014

(65) Prior Publication Data

US 2014/0262649 A1    Sep. 18, 2014

Related U.S. Application Data

(60) Provisional application No. 61/780,875, filed on Mar. 13, 2013.

(51) Int. Cl.
*F16F 9/50*    (2006.01)
*F16F 9/44*    (2006.01)
*F16F 9/19*    (2006.01)
*F16F 9/34*    (2006.01)

(52) U.S. Cl.
CPC ... *F16F 9/44* (2013.01); *F16F 9/19* (2013.01); *F16F 9/3405* (2013.01); *F16F 9/3415* (2013.01)

(58) Field of Classification Search
CPC ............... F16F 9/44; F16F 9/19; F16F 9/48; F16F 9/3214; F16F 9/3221; F16F 9/3405; F16F 9/3415

USPC ............. 188/283, 283.1, 284, 285, 288, 312, 188/316, 317, 319.1, 319.2, 322.22, 188/322.15; 267/64.12, 64.13, 64.18
See application file for complete search history.

(56) References Cited

U.S. PATENT DOCUMENTS

| | | | | |
|---|---|---|---|---|
| 3,763,970 | A * | 10/1973 | Anderson | 188/282.1 |
| 4,863,147 | A * | 9/1989 | Loeber et al. | 267/64.26 |
| 5,522,483 | A * | 6/1996 | Koch | 188/282.2 |
| 6,360,857 | B1 * | 3/2002 | Fox et al. | 188/281 |
| 2004/0182662 | A1 * | 9/2004 | Heideman | 188/285 |
| 2011/0024245 | A1 * | 2/2011 | Nezu et al. | 188/283 |

* cited by examiner

*Primary Examiner* — Pamela Rodriguez
(74) *Attorney, Agent, or Firm* — Richards Patent Law P.C.

(57) ABSTRACT

The present disclosure provides hydraulic dampening systems wherein the dampening effect may be controlled by rotating a body of the dampener, after the dampening system has been installed and in use. The system includes a piston including a front disk and back disk, wherein the front disk has a reduced diameter with respect to the back disk. A washer is positioned between the two piston disks, wherein the diameter of the washer is greater than the piston back disk, wherein the washer includes at least two protruding tabs. The washer is frictionally engaged with the body of the dampener. As the body is rotated, the washer is rotated such that the washer tabs engage at least a portion of the piston front disk to rotate the piston along a threaded surface of a shaft of the system.

15 Claims, 4 Drawing Sheets

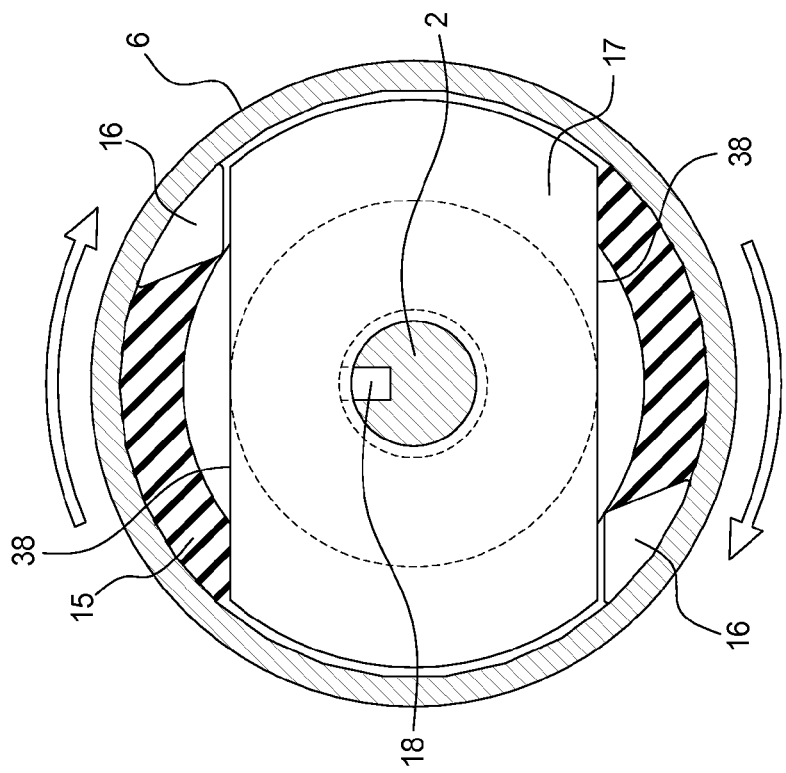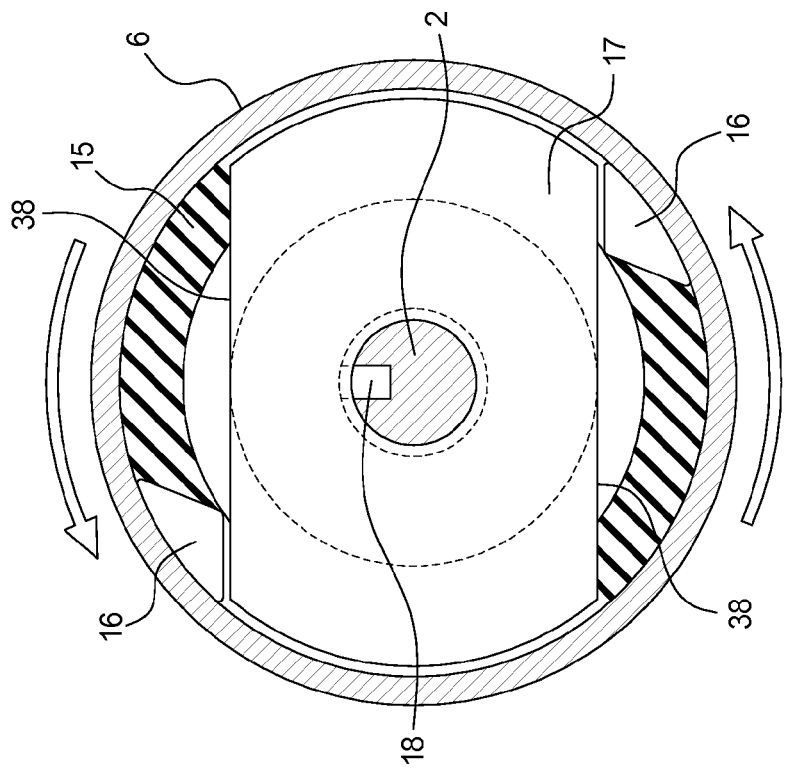

HYDRAULIC DAMPENER SYSTEMS

CROSS-REFERENCE TO RELATED APPLICATIONS

This application incorporates by reference and claims priority to U.S. Provisional Application 61/780,875 filed on Mar. 13, 2013.

BACKGROUND OF THE INVENTION

The present subject matter relates generally to a hydraulic dampener system, wherein a user controls the degree of dampening by rotating a cylindrical housing of the system.

Conventional hydraulic dampeners incorporate an adjustment means to control the flow of hydraulic fluid, which in turn controls the degree of dampening. Conventional adjustment techniques typically include the application of a separate tool to adjust the dampening effect. Further, conventional designs only allow a user to adjust the dampening before the dampener is mounted into place. Once the dampener is installed, a user cannot adjust the dampening without removing the dampener from the mounting. After which, a user must remount and reinstall the dampener.

In other dampeners, the degree of dampening may be adjusted by the rotation of the dampener housing, but only when the dampener is in a fully closed position. In these dampeners, corresponding mating portions in the housing and piston mate only at the extreme end of the piston's travel within the housing. As a result, the degree of dampening can only be modified when in the "closed" position. This limitation is less than ideal and can be improved upon.

Accordingly, there is a need for a dampening system wherein the degree of dampening may be altered while the dampener is in use.

BRIEF SUMMARY OF THE INVENTION

The present disclosure provides improved hydraulic dampener systems. The systems disclosed here are designed for a sealed self-contained hydraulic dampener in which the dampening may be controlled by rotating the cylindrical housing body of the system. For example, rotating the housing body in one direction may increase the dampening and rotating the housing in the opposite direction may decrease the dampening. The system allows the rate of dampening to be controlled when the system is at rest or in motion. In addition, the dampening setting does not change unless it is intentionally adjusted. Further, the dampener system may be mounted and used in a horizontal or vertical orientation.

In an example, the system includes a piston including a front disk and a back disk, wherein a washer is positioned between the front disk and back disk. The washer may include triangular tabs molded onto a surface of the washer that face the front disk of the piston. In an example, the tabs interact with at least a portion of the perimeter of the front disk of the piston.

The dampener system may also include a piston housing including a cylindrical housing, a housing front end, and a housing back end, wherein the housing back end includes a housing back end opening for the shaft connected to the piston to exit the housing. The housing front end and the housing back end may include grooves for the ends of the cylindrical housing to engage. In other words, the housing front end and housing back may be free and not integrally formed with the cylindrical housing, therefore, allowing the cylindrical housing to float and rotate freely. The system may include a plurality of seals, such as O-rings, that are positioned within the grooves of the housing front end and the housing back end. The seals serve to seal the hydraulic fluid within the interior of the cylindrical housing. The seals may include lubrication that is applied during assembly, wherein the lubrication serves to ensure a seal between the cylindrical body and the housing front end and the housing back end. Lubrication also enables a user to easily twist and rotate the housing to alter the degree of dampening. Similarly, the seals may be made from self-lubricating materials that help to maintain easy rotation of the housing throughout the life of the system.

As the cylindrical housing is rotated, the inner diameter of the housing body frictionally engages with the outer diameter of the washer. As a result, the washer rotates with the housing body. As the washer rotates, the tabs on the washer come in contact with a portion of the piston front disk. At that point, further rotation of the housing body results in rotation of the piston. As the piston is rotated, the threaded central opening of the piston is screwed along a threaded portion of the shaft, which may include a slot having a milled radius. Hydraulic fluid passes from one side of the piston to the other by flowing through a passage created by the slot. As the piston is screwed along the thread of the shaft, hydraulic fluid flow is decreased as a function of the size of the passage decreasing, thus increasing the dampening. As the rotation of the cylindrical housing is reversed, the piston is screwed in the opposite direction, increasing the size of the passage, and decreasing the dampening.

In an example, the piston back disk includes notches along the perimeter of the back disk to act as by-pass valves on the return stroke of the dampener. Hydraulic fluid passes through the notches and cause the washer to curl slightly, allowing the hydraulic fluid to pass from one side of the piston to the other side without any dampening action.

The present disclosure provides a hydraulic dampener system comprising a threaded central opening, a piston front disk, and a piston back disk, wherein a measurement across a front face of the piston front disk is smaller than a diameter of the piston back disk, wherein the measurement across the front face extends through the threaded center opening. In an example, the piston back disk includes at least one notch in its perimeter.

The system includes a washer positioned between the piston front disk and the piston back disk, wherein the washer includes a front side and back side, wherein the front side faces the piston front disk and the back side faces the piston back disk, wherein the front side includes at least one washer tab. The diameter of the piston back disk is smaller than a diameter of the washer. In an example, the washer tab is triangular.

The system also includes a shaft including a shaft back end and shaft front end, wherein the shaft front end includes a threaded surface to engage the threaded central opening of the piston, wherein the shaft front end further includes a slot. In an example, the slot includes a milled radius.

When the threaded central opening of the piston engages the threaded surface of the shaft front end, a passage is formed through the slot from the piston front disk to the piston back disk such that, when the threaded central opening of the piston is rotated along the threaded surface of the shaft, a size of the passage is altered.

In addition, when the washer is rotated, the washer tab engages with a portion of the piston front disk to rotate the piston along the threaded surface of the shaft front end. For example, the piston front disk includes two flat sections along its perimeter, wherein, when the washer is rotated, the washer tab engages with one of the flat sections to rotate the piston along the threaded surface of the shaft front end.

In an example, the system includes a piston housing including a cylindrical body to receive the piston, the washer, and a portion of the shaft, wherein an inner diameter of the piston housing is sized to frictionally engage an outer diameter of the washer. The piston housing also includes a housing front end and a housing back end including a housing back end opening, wherein the shaft back end extends through the housing back end opening. When the piston housing is rotated, the piston washer is rotated such that the tab engages with a portion of the piston front disk.

The present disclosure also provides a hydraulic dampener system including a piston including a threaded central opening, a piston front disk, and a piston back disk, wherein a measurement across a front face of the piston front disk is smaller than a diameter of the piston back disk, wherein the measurement across the front face extends through the threaded center opening. The system also includes a washer positioned between the piston front disk and the piston back disk, wherein the washer includes a front side and back side, wherein the front side faces the piston front disk and the back side faces the piston back disk, wherein the front side includes at least one washer tab. In addition, the system includes a shaft including a shaft back end and shaft front end, wherein the shaft front end includes a threaded surface to engage the threaded central opening of the piston, wherein the shaft front end further includes a slot.

The system also includes a piston housing including a cylindrical body to receive the piston and a portion of the shaft, wherein an inner diameter of the piston housing is sized to frictionally engage an outer diameter of the washer. The piston housing also includes a housing front end and a housing back end, wherein the back end includes a housing back end opening, wherein the shaft back end extends through the housing back end opening.

When the piston housing is rotated, the piston washer is rotated such that the tab engages with a portion of the piston front disk. When the piston washer is rotated while the tab is engaged with the piston front disk, the piston is rotated along the threaded portion of the shaft front end. Also, when the piston is rotated along the threaded portion of the shaft front end, the size of a passage formed between the threaded central opening of the piston and the slot is altered, wherein the size of the passage restricts the amount of hydraulic fluid that passes from one side of the piston to the other side.

In an example, the piston back disk includes at least one notch in its perimeter. In another example, a perimeter of the piston front disk includes two flat sections, wherein, when the washer is rotated, the washer tab engages with one of the flat sections to rotate the piston along the threaded surface of the shaft front end.

In an example, the housing cylinder includes hydraulic fluid, wherein, when the piston is moved toward the housing back end, hydraulic fluid moves through a notch in the perimeter of the piston back disk and bends a portion of the washer away from the piston back disk. When the piston is moved toward the housing front end, the washer may cover a notch in the perimeter of the piston back disk, preventing hydraulic fluid from flowing through the notch.

In an example, the washer tab is triangular. In another example, the slot includes a milled radius.

The housing front end and the housing back end may not be integrally formed with the cylindrical body of the piston housing.

The housing front end may include a front end groove to receive a body front end of the cylindrical body, and the housing back end may include a back end groove to receive a body back end of the cylindrical body.

An advantage of the present system is providing a hydraulic dampener that may be adjusted during use to achieve the desired dampening. In other words, the dampener does not need to be uninstalled to adjust the dampening degree.

A further advantage of the present system is that a user may both increase or decrease the dampening effect of the hydraulic dampener.

Another advantage of the present system is providing a means to control the speed of dampening when the dampener is at rest or in motion over the entire length of the stroke.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4A is a front view of an example of the piston washer in combination with the piston second disk, as the washer is rotated counter-clockwise.

FIG. 4B is a front view of an example of the piston washer in combination with the piston second disk, as the washer is rotated clockwise.

DETAILED DESCRIPTION OF THE INVENTION

Figure 1:
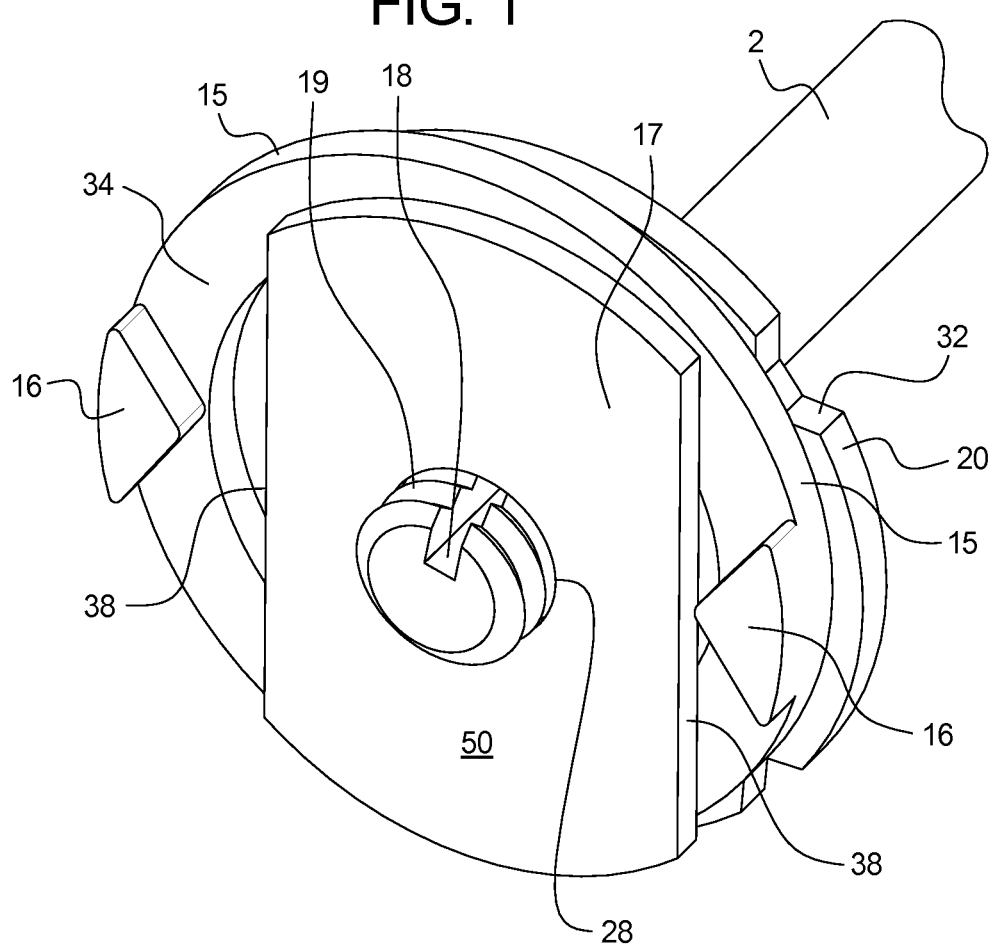
FIG. 1 is a perspective view of a washer, piston, and shaft.

The present disclosure provides hydraulic dampener systems 100 including a piston 50, a washer 15, and a shaft 2, as shown in FIG. 1. The piston 50 includes a threaded central opening 28 that is configured to engage a threaded surface of the shaft 2. In an example, the threaded surface of the shaft 2 and the threaded central opening 28 of the piston 50 define a class 5 interference fit. The piston 50 may be made of any suitable material including, but not limited to, metal, plastic, resin, among others. For example, the piston 50 may be made of fiberglass reinforced nylon, such as, Zytel®.

The piston 50 includes a piston front disk 17 and a piston back disk 20. As shown in FIG. 1, a measurement taken across the face of the piston front disk 17 and extending through the threaded central opening 28 is smaller than a diameter of the piston back disk 20. In an example, the reduced size is achieved because the piston front disk 17 includes two flat sections 38 along its perimeter. Although, it is contemplated that there are numerous designs for the piston front disk 17 that would provide a reduced size to accomplish the advantages described herein. For example, the piston front disk 17 may include an ovular shape, wherein a measurement across at least one section of the piston front disk 17 is less than the diameter of the piston back disk 20. Alternatively, the piston front disk 17 may be circular with sections cut away from the perimeter of the piston front disk 17.

The piston back disk 20 may be generally circular. In an example, the piston back disk 20 includes at least one notch 32 in its perimeter, as is discussed further below.

Figure 5B:
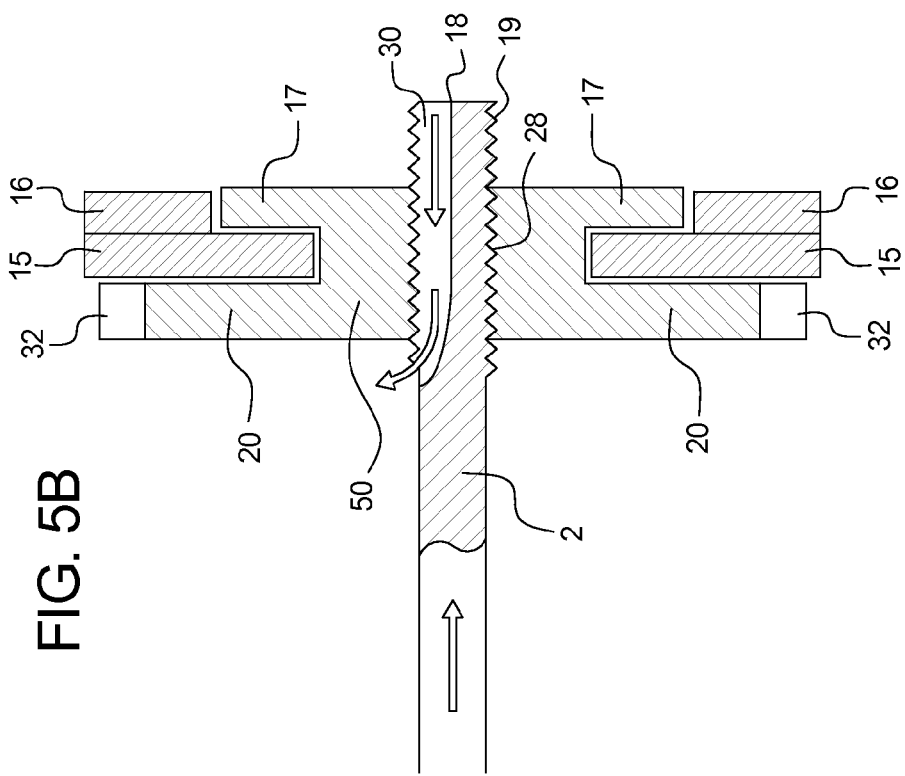
FIG. 5B is a side cross-sectional view of an embodiment the piston in combination with the shaft, as the piston is moved towards the housing front end.
Figure 5A:
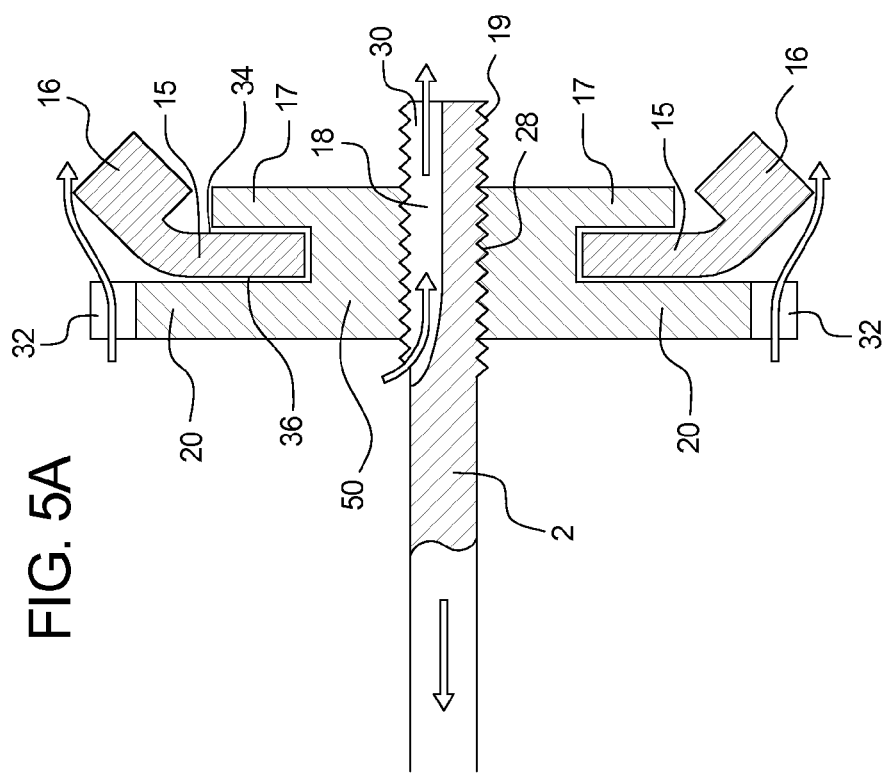
FIG. 5A is a side cross-sectional view of an embodiment of the piston in combination with the shaft, as the piston is away from the housing front end.

The system 100 also includes a washer 15 positioned between the piston front disk 17 and the piston back disk 20, as shown in FIGS. 5A-5B. The washer may be made of rubber, plastic, or combinations thereof, among other materials. The washer 15 includes a front side 34 and a back side 36, wherein the front side 34 faces the piston front disk 17 and the back side 36 faces the piston back disk 20. The diameter of the piston back disk 20 is smaller than a diameter of the washer 15.

Figure 2:
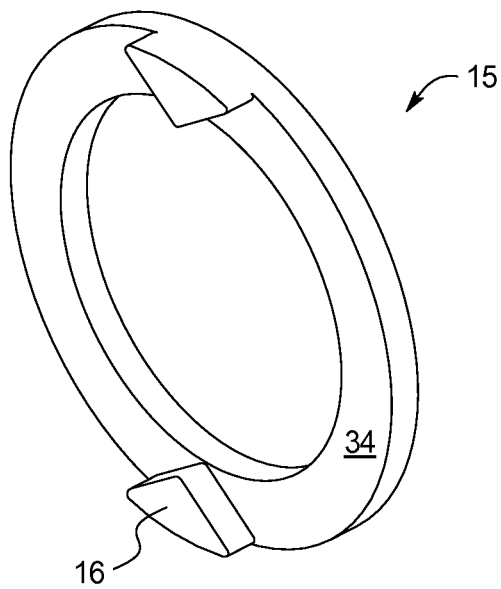
FIG. 2 is a perspective view of an example the washer disclosed herein.

The front side 34 of the washer 15 includes at least one washer tab 16. The tab 16 may be any suitable shape including, but not limited to, square, triangular, circular, spherical, or rectangular, among other shapes. In the example shown in FIG. 2, the washer tab 16 is triangular. The tab 16 protrudes from a surface of the front side 34 of the washer 15. The extent of the protrusion is such that the tab 16 is capable of engaging at least one portion of the piston front disk 17. The tab 16 may be made from the same or different material as the washer 15.

The system 100 also includes a shaft 2 including a shaft front end 19 and a shaft back end 22, wherein the shaft front end 19 includes a threaded surface to engage the threaded central opening 28 of the piston 50. The shaft 2 is typically a rod shape. The shaft 2 may be made of any suitable material including, but not limited to, metal, plastic, or combinations thereof, among other materials. The threaded surface of the shaft front end 19 may include class 5 interference threads, which ensure that the threaded central opening 28 does not drift to a different position along the shaft front end 19 without user manipulation, such as, physically rotating the cylindrical body 6.

In the example wherein the piston front disk 17 includes at least two flat sections 38, when the washer 15 is rotated, the washer tab 16 engages with one of the flat sections 38 to rotate the piston 50 along the threaded surface of the shaft front end 19, as shown in FIGS. 4A-4B.

The shaft front end 19 further includes a slot 18, as shown in FIGS. 5A-5B. In an example, the slot 18 includes a milled radius. When the threaded central opening 28 of the piston 50 engages the threaded surface of the shaft front end 19, a passage 30 is formed through the slot 18 from the piston front disk 17 to the piston back disk 20, as shown in FIGS. 5A-5B. When the threaded central opening 28 is rotated along the threaded surface of the shaft front end 19, a size of the passage 30 is altered.

Figure 3:
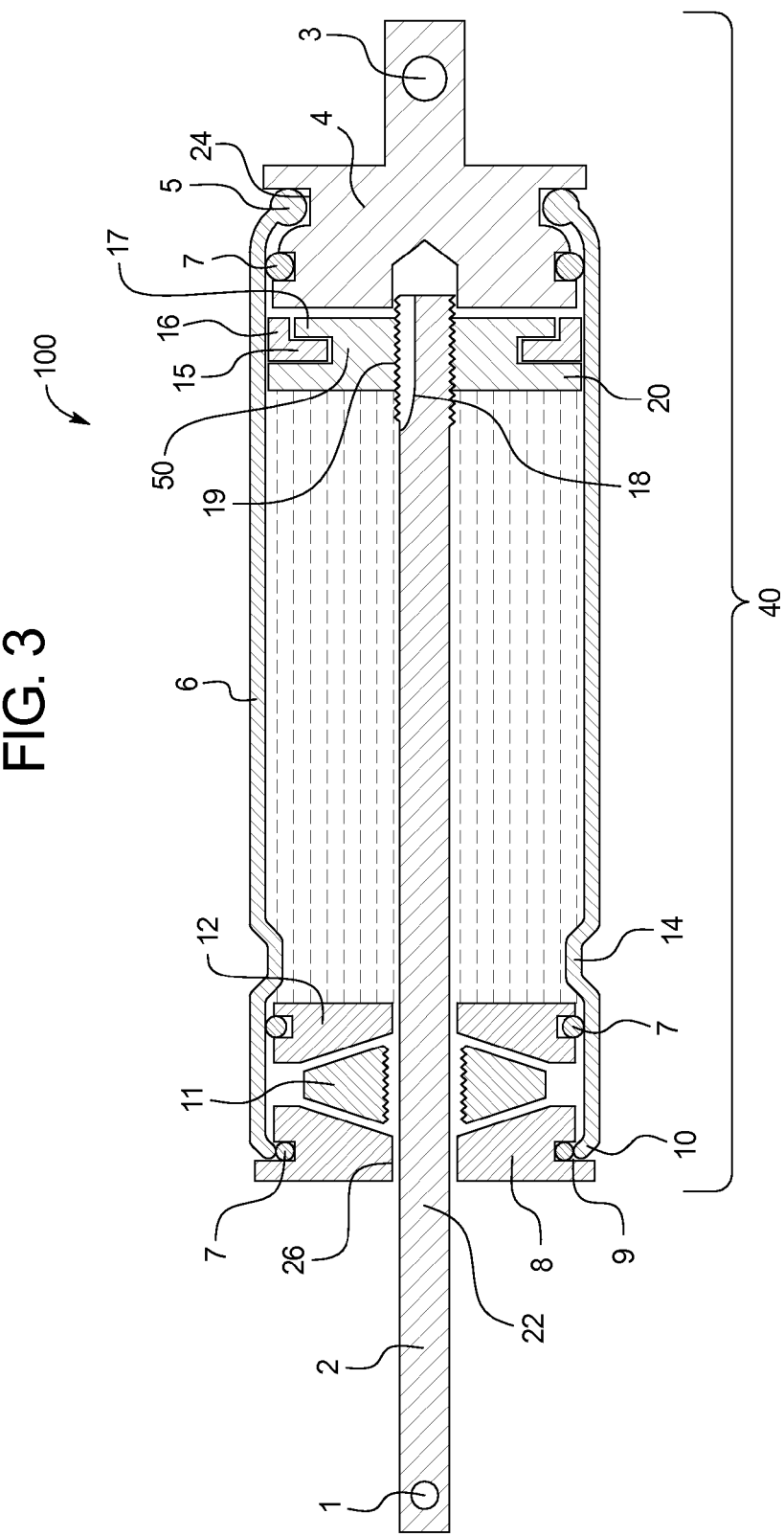
FIG. 3 is a cross-sectional side view of an example of a hydraulic dampener according to the teachings presented herein.

As shown in FIG. 3, the system 100 may include a piston housing 40 including a cylindrical body 6 to receive the piston 50, washer 15, and a portion of the shaft 2, wherein an inner diameter of the cylindrical body 6 is sized to frictionally engage an outer diameter of the washer 15. The piston housing 40 also includes a housing front end 4 and a housing back end 8 including a housing back end opening 26, wherein the shaft back end 22 extends through the housing back end opening 26. The cylindrical body 6 may not be integrally formed with the housing front end 4. As a result, the cylindrical body 6 is free to float allowing a user to grasp and rotate the cylindrical body 6 independent of the housing front end 4. The cylindrical body 6 may also not be integrally formed with the housing back end 8.

The housing front end 4 may include a front end groove 24 to receive a body front end 5 of the cylindrical body 6. Similarly, the housing back end 8 may include a back end groove 9 to receive a body back end 10 of the cylindrical body 6. A seal 7, such as an O-ring, may be positioned between the housing front end 4 and the cylindrical body 6, and between the housing back end 8 and the cylindrical body 6, as shown in FIG. 3. The seals 7 may be impregnated with lubricant during the molding process, such that the lubricant "weeps" to the surface of the seal 7 in order to maintain contact between the outer diameter of the seal 7 and the inner diameter of the cylindrical body 6. Without the continual weeping of the lubricant from the seal 7, the seal 7 may take a compression set in contact with the inner diameter of the cylindrical tube 6 and produce enough friction to hinder twisting of the cylindrical body 6.

The housing back end 8 may also include a shaft seal 11 including molded wipers on the inner diameter of the shaft seal that seals and compresses shaft 2 between the housing back end 8 and a rear bearing 12. The rear bearing 12 may also include a groove for receiving a seal 7, such as an O-ring, as shown in FIG. 3. The housing back end 8, the shaft seal 11, and the rear bearing 12 may be held in position by indentation 14 within the cylindrical body 6, as shown in FIG. 3.

The housing front end 4 may include a housing front end opening 3 that may be used for mounting the dampener system 100. Similarly, the shaft back end 22 may include a shaft opening 1 that may be used for mounting the dampener system 100.

When the cylindrical body 6 of the piston housing 40 is rotated, the washer 15 is rotated because the washer 15 is frictionally engaged with an inner surface of the cylindrical body 6 of the piston housing 40. As the washer 15 is rotated, the tab 16 engages with a portion of the piston front disk 17. When the washer 15 is rotated while the tab 16 is engaged with the piston front disk 17, the piston 50 is rotated along the threaded portion of the shaft front end 19. Further, when the piston 50 is rotated along the threaded portion of the shaft front end 19, the size of a passage 30 formed between the threaded central opening 28 of the piston 50 and the slot 18 is altered, wherein the size of the passage 30 restricts the amount of hydraulic fluid that passes from one side of the piston 50 to the other side. Therefore, by rotating the cylindrical body 6 of the piston housing 40, a user may alter the dampening effect of the system 100.

As shown in FIG. 4A, when the cylindrical body 6 is rotated counter-clockwise, the washer 15 rotates with the cylindrical body 6 because the washer 15 is frictionally engaged with the cylindrical body 6. As a result, the washer tabs 16 engage the flat section 38 of the piston front disk 17, thereby rotating the piston 50 along the threaded surface of the shaft front end 19. As a result, the size of passage 30 may be increased and the dampening is decreased. In contrast, as shown in FIG. 4B, when the cylindrical body 6 is rotated clockwise, the size of the passage 30 is decreased, which increases the dampening effect. Of course, it is contemplated that the cylindrical body 6 may be rotated counter-clockwise to increase the size of the passage 30.

In an example, the piston back disk 20 includes at least one notch 32 in its perimeter. For example, the housing cylinder 6 may include hydraulic fluid, wherein, when the piston 50 is moved toward the housing back end 8, as shown in FIG. 5A, hydraulic fluid moves through a notch 32 in the perimeter of the piston back disk 20 and bends a portion of the washer 15 away from the piston back disk 20. When the piston 50 is moved toward the housing front end 4, as shown in FIG. 5B, the washer 15 may cover a notch 32 in the perimeter of the piston back disk 20, preventing hydraulic fluid from flowing through the at least one notch 32, and allowing hydraulic fluid to pass only through passage 30. As a result, the return stroke of the piston 50 allows the hydraulic fluid to flow through both the slot 18 and the at least one notch 32, which reduces the dampening when compared to the forward stroke. The notch 32 or notches 32 may take on various sizes and shapes, which can affect the volume of hydraulic fluid that passes through the at least one notch 32 on the return stroke.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. A hydraulic dampener system comprising:
   a piston including a threaded central opening, a piston front disk, and a piston back disk, wherein a measurement across a front face of the piston front disk is smaller than a diameter of the piston back disk, wherein the measurement across the front face extends through the threaded central opening;
   a washer positioned between the piston front disk and the piston back disk, wherein the washer includes a front side and back side, wherein the front side faces the piston front disk and the back side faces the piston back disk, wherein the front side includes at least one washer tab, wherein the diameter of the piston back disk is smaller than a diameter of the washer; and
   a shaft including a shaft back end and shaft front end, wherein the shaft front end includes a threaded surface to engage the piston central opening, wherein the shaft front end further includes a slot,
   wherein, when the threaded central opening of the piston engages the threaded surface of the shaft front end, a passage is formed through the slot from the piston front disk to the piston back disk such that, when the threaded central opening of the piston is rotated along the threaded surface of the shaft front end, a size of the passage is altered,
   wherein, when the washer is rotated, the washer tab engages with a portion of the piston front disk to rotate the piston along the threaded surface of the shaft front end.

2. The system of claim 1 wherein the piston back disk includes at least one notch in its perimeter.

3. The system of claim 1 wherein the piston front disk includes two flat sections along its perimeter,
   wherein, when the washer is rotated, the washer tab engages with one of the flat sections to rotate the piston along the threaded surface of the shaft front end.

4. The system of claim 1 wherein the washer tab is triangular.

5. The system of claim 1 wherein the slot includes a milled radius.

6. The system of claim 1 further comprising a piston housing comprising
   a cylindrical body to receive the piston and a portion of the shaft, wherein an inner diameter of the cylindrical body is sized to frictionally engage an outer diameter of the washer,
   a housing front end, and
   a housing back end including a housing back end opening, wherein the shaft back end extends through the housing back end opening,
   wherein, when the cylindrical body is rotated, the washer is rotated such that the tab engages with a portion of the piston front disk.

7. A hydraulic dampener system comprising:
   a piston including a threaded central opening, a piston front disk, and a piston back disk, wherein a measurement across a front face of the piston front disk is smaller than a diameter of the piston back disk, wherein the measurement across the front face extends through the threaded central center opening;
   a washer positioned between the piston front disk and the piston back disk, wherein the washer includes a front side and back side, wherein the front side faces the piston front disk and the back side faces the piston back disk, wherein the front side includes at least one washer tab; and
   a shaft including a shaft back end and shaft front end, wherein the shaft front end includes a threaded surface to engage the threaded central opening, wherein the shaft front end further includes a slot; and
   a piston housing comprising
      a cylindrical body to receive the piston and a portion of the shaft, wherein an inner diameter of the cylindrical body is sized to frictionally engage an outer diameter of the washer,
      a housing front end, and
      a housing back end including a housing back end opening, wherein the shaft back end extends through the housing back end opening,
   wherein, when the cylindrical body is rotated, the washer is rotated such that the tab engages with a portion of the piston front disk,
   wherein, when the washer is rotated while the tab is engaged with the piston front disk, the piston is rotated along the threaded portion of the shaft front end,
   wherein, when the piston is rotated along the threaded portion of the shaft front end, the size of a passage formed between the threaded central opening of the piston and the slot is altered, wherein the size of the passage restricts the amount of hydraulic fluid that passes from one side of the piston to the other side.

8. The system of claim 7 wherein the piston back disk includes at least one notch in its perimeter.

9. The system of claim 7 wherein a perimeter of the piston front disk includes two flat sections,
   wherein, when the washer is rotated, the washer tab engages with one of the flat sections to rotate the piston along the threaded surface of the shaft front end.

10. The system of claim 7 wherein the piston housing includes hydraulic fluid, wherein, when the piston is moved toward the housing back end hydraulic fluid moves through a notch in the perimeter of the piston back disk and bends a portion of the washer away from the piston back disk.

11. The system of claim 7 wherein, when the piston is moved toward the housing front end, the washer covers a notch in the perimeter of the piston back disk, preventing hydraulic fluid from flowing through the notch.

12. The system of claim 7 wherein the washer tab is triangular.

13. The system of claim 7 wherein the slot includes a milled radius.

14. The system of claim 7 wherein the housing front end and the housing back end are not integrally formed with the cylindrical body of the piston housing.

15. The system of claim 7 wherein the housing front end includes a front end groove to receive a body front end of the cylindrical body, and the housing back end includes a back end groove to receive a body back end of the cylindrical body.

* * * * *